US005167978A

United States Patent [19]
Gersbeck

[11] Patent Number: 5,167,978
[45] Date of Patent: Dec. 1, 1992

[54] PRESS FOR THE CONTINUOUS PRODUCTION OF THIN CHIPBOARD AND FIBREBOARD

[75] Inventor: Rolf Gersbeck, Ronnenberg, Fed. Rep. of Germany

[73] Assignee: Hermann Berstorff Maschinenbau GmbH, Hannover, Fed. Rep. of Germany

[21] Appl. No.: 611,101

[22] Filed: Nov. 9, 1990

[30] Foreign Application Priority Data

Nov. 10, 1989 [DE] Fed. Rep. of Germany ....... 3937421

[51] Int. Cl.[5] ....................... B29C 43/34; B29C 43/48

[52] U.S. Cl. .................................. 425/373; 100/153; 156/555; 156/583.5

[58] Field of Search ............... 425/367, 373, 366, 130, 425/DIG. 235, 363, 371; 156/555, 583.5; 100/153, 155 R, 9.3 RP

[56] References Cited

U.S. PATENT DOCUMENTS

| | | | |
|---|---|---|---|
| 3,887,314 | 6/1975 | Andresen et al. | 425/371 |
| 3,891,376 | 6/1975 | Gersbeck et al. | 425/373 |
| 3,932,258 | 1/1976 | Brinkmann et al. | 425/329 |
| 3,938,927 | 2/1976 | Brinkmann et al. | 425/224 |
| 4,744,854 | 5/1988 | Schenz | 425/373 |
| 4,932,855 | 6/1990 | Gersbeck et al. | 425/367 |
| 4,946,635 | 8/1990 | Steininger | 425/373 |

FOREIGN PATENT DOCUMENTS

| | | | |
|---|---|---|---|
| 2329600 | 1/1975 | Fed. Rep. of Germany | 425/373 |
| 2420029 | 10/1975 | Fed. Rep. of Germany | 425/373 |
| 2724060 | 5/1977 | Fed. Rep. of Germany . | |

*Primary Examiner*—Jay H. Woo
*Assistant Examiner*—Khanh P. Nguyen
*Attorney, Agent, or Firm*—Foley & Lardner

[57] ABSTRACT

A press for the continuous production of thin chipboard and fibreboard includes a central rotatable drum and a feed roller; a nip being defined between the curved exterior surfaces of the drum and roller. An endless steel band passes around a major portion of the curved surfaces of both drum and roller and passes through the nip. Other rollers are provided for guiding, tensioning and applying pressure to the band. The feed roller has a large diameter, of at least 2 m, and is provided with drive means so as to be rotatable. These features, surprisingly, enable the board output to be increasing while, at the same time improving the physical characteristics of the board.

4 Claims, 3 Drawing Sheets

PRESS FOR THE CONTINUOUS PRODUCTION OF THIN CHIPBOARD AND FIBREBOARD

FIELD OF THE INVENTION

The present invention relates to a press suitable for use in the continuous production of thin chipboard and fibreboard.

BACKGROUND OF THE INVENTION AND PRIOR ART DISCUSSION

In German Patent Specification No. DE 2724060, there is disclosed a press suitable for the continuous production of thin chipboard and fibreboard. Such a press comprises a central, heated press drum which is mounted for rotation in suitable supports. An endless steel band passes around a major portion of the external surface of the press drum. The band also passes around a feed roller, a tensioning roller and a discharge roller. The chips or fibres are mixed with a bonding agent and are collected by the band. The material is subjected to a compression force between the drum and the strip and to a drawing force in the nip between the drum and the strip.

Modifications to such a press have been made with the aim of achieving higher outputs. In the main, the press length, that is to say, the length of the region in which the material is subjected to compression between the band and the drum, has been extended to achieve this. However, the complication arises that the time taken for the bonding agents to set remains unaltered. The increasing of the press length is usually effected, in the case of such rotary presses, by increasing the drum diameter. Presses of this type often have drums which have a diameter of 5 m, a bale length of approximately 3 m and a drum weight of approximately 110 t.

The press length, has in fact been extended by increasing the diameter of the central drum from 3 to 5 meters, so that a web having a thickness of, for example 3 mm can be compressed continuously to produce an output of up to approximately 40 m/min. The output rate is, in general, dependent upon the web thickness.

In order to operate economically, presses of this size and configuration must produce a high output to justify the extremely high capital investment required therefor.

When attempts were made to increase the output of such presses, however, it soon became apparent that the quality of the compressed chipboard or fibreboard web produced was unsatisfactory. Moreover, the service-life of the endless steel band became considerably shorter.

OBJECTS OF THE INVENTION

The present invention seeks to provide a press which is generally of the above-mentioned type and which does not suffer from the above-mentioned disadvantages. In particular, the present invention seeks to provide a press which enables an increase in output to be achieved without adversely affecting the quality of the board, particularly with regard to the overall density and the transverse tensile strength of the compressed web. Moreover, the present invention seeks to provide a press in which increasing the output of the press does not adversely affect the service-life of the endless steel band.

SUMMARY OF THE INVENTION

According to the present invention, there is provided a press for the continuous production of thin chipboard and fibreboard from layers of wood chips and fibres and at least one bonding agent, comprising a press drum; support means mounting said drum for rotation; said drum including an external curved surface; a feed roller disposed adjacent said press drum, said feed roller including an external curved surface, said external curved surfaces jointly defining a nip; an endless steel band disposed around a major portion of said curved surface of said drum and passing through said nip; said band carrying said layers whereby said layers are compressed between said band and said curved surface of said drum; a plurality of roller means acting on said band to guide, to tension and to apply pressure to said band such that said chip and fibre layers and bonding agent are subjected to a surface pressure between said band and said press drum and are subjected to a drawing pressure in nips defined between said press drum adn said pressure rollers, and further roller means for discharging said board thus produced; wherein said steel band is disposed around a major port of said external curved surface of said feed roller and said feed roller has a diameter of at least 2 m, said press further including drive means operatively connected to said feed roller for rotating said roller.

If the output of a web having a thickness of 3 mm is increased to 50 m/min using a press in accordance with the present invention, a substantially better quality board and/or web of the compressed article is produced than was possible using prior art arrangements. The improved qualities, particularly the improved transverse tensile strength and overall density are unexpected but are achieved by driving the feed roller by entraining the steel band by the roller and by providing the feed roller with a diameter of at least 2 m, preferably 3 m. The improved quality of the board or web is probably attributable to the above-identified features producing a longer press nip (when viewed in the transverse direction) between the press drum having a diameter of 5 m and a feed roller having a greater diameter than used hitherto, but at an identical, specific pressure.

By entraining the endless steel band by means of the feed roller, the tension of the steel band is considerably relieved. High tensile forces are required for feeding the chips and fibres of material, which latter are to be compressed to about 1/10 of their original thickness into the nip between the feed roller and the press drum. However, since the feed roller is provided with its own drive means, the steel band, which extends around substantially two thirds of the curved surface of the feed roller, is entrained at the location where the greatest resistance to entrainment of the material to be compressed is to be found.

The prolongation of the service-life of the endless band is almost certainly due to the fact that, if a feed roller having a diameter of at least 2,000 mm is used, the band is subjected to considerably smaller alternate bending forces. The band is subjected to a deformation force when it enters the nip between the feed roller and the press drum and, on leaving the nip, the material being carried has a natural resilience which tends to bend the band outwardly. By using a feed roller having a larger diameter than used hitherto, the length of the nip between the feed roller and the press drum is increased, so that the bending of the band takes place more slowly. This obviously means that the stresses acting on the band are reduced.

It is possible, in this way to extend the service-life of the endless steel band, which may have a length of 50 m, by about 20%.

Preferably, the feed roller has a diameter of from 2 to 3.5 m; a diameter of 3 m proving particularly advantageous.

Desirably, said drive means for said feed roller comprises electrical drive means and a transmission unit transmitting said drive from said drive means to said feed roller.

BRIEF DESCRIPTION OF THE DRAWINGS

One embodiment of a press in accordance with the present invention will be further described, by way of example, with reference to the accompanying drawings, in which.

DESCRIPTION OF PREFERRED EMBODIMENTS

Figure 1:
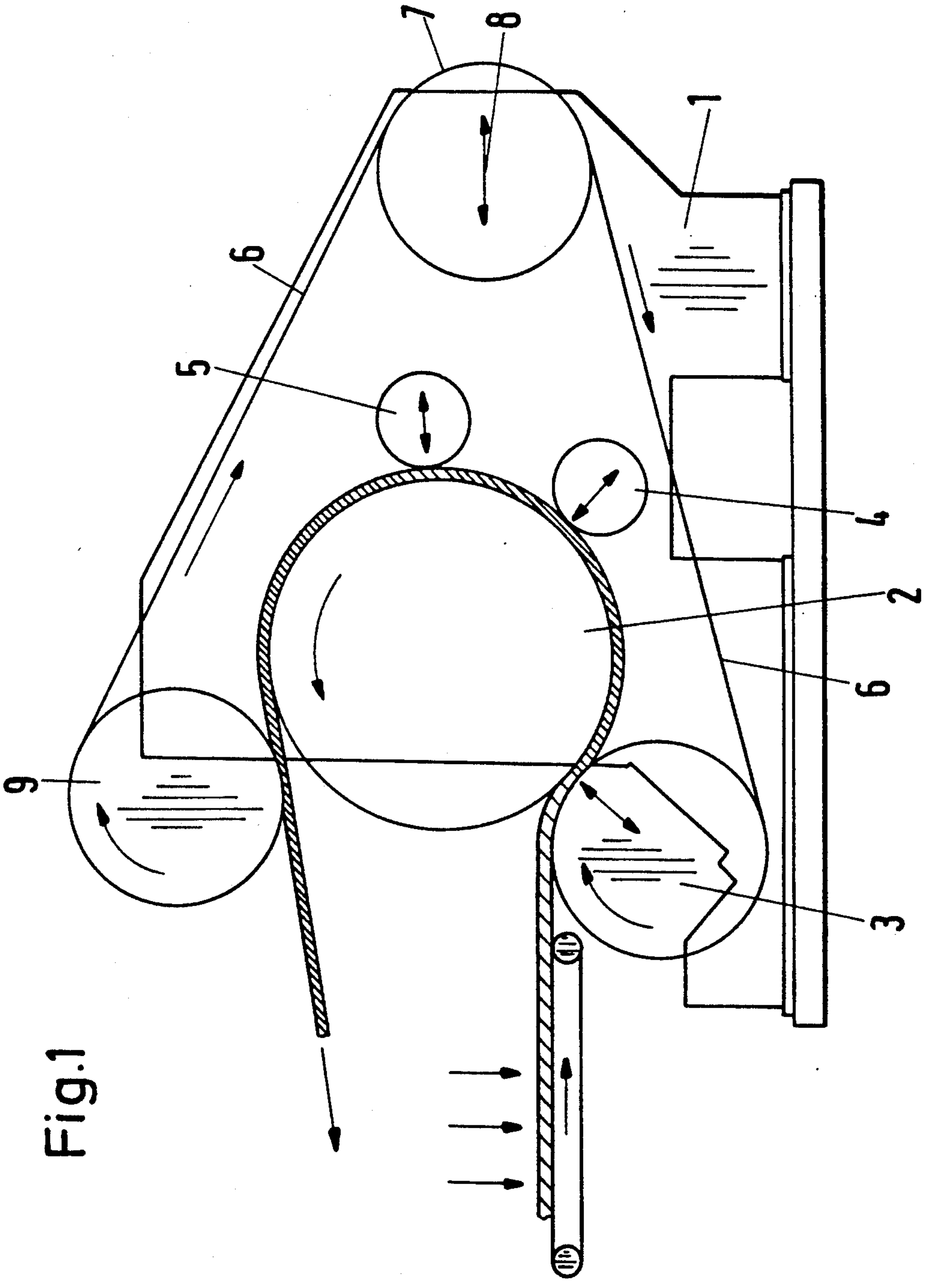
FIG. 1 is a schematic, longitudinal sectional view through a press in accordance with the present invention.

In FIG. 1, there is shown a press in accordance with the present invention which comprises a central press drum 2 mounted for rotation on a support 1. The drum 2 is heatable by means not shown and has a feed roller 3 and two pressure rollers 4 and 5 associated therewith. A rotatable endless steel band 6 passes around major portions of the periphery of the drum 2 and the roller 3 and between the rollers 4 and 5 and the drum 2. The band also passes around a tension roller 7, which latter is adjustable in the direction of the double-headed arrow 8. The roller 7 subjects the band 6 to a high tensile stress. The band also passes around a guide roller 9. The steel band thus loops around the press drum 2, the guide roller 9, the tension roller 7 and the feed roller 3.

Wood chips or fibres treated with a bonding agent are fed onto the band in the region of the feed roller 3 and are carried thereby around the periphery of the drum 2. As they pass around the drum 2, the wood chips or fibres are compressed. Each of the rollers 3, 4 and 5 are adjustable in a direction towards and away from the axis of the press drum 2 by means of hydraulic piston and cylinder arrangements which are not shown.

Figure 2:
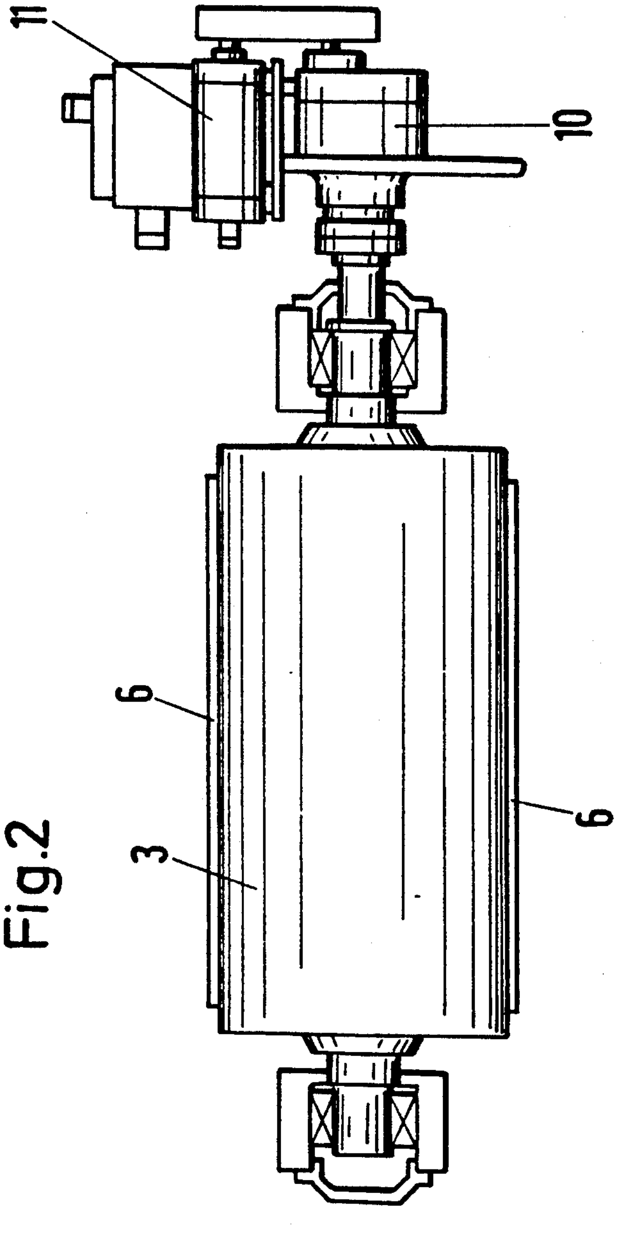
FIG. 2 is a view of a feed roller forming a part of the press shown in FIG. 1.

As shown in FIG. 2, the feed roller 3 has a drive means associated therewith for rotating the roller. Such drive means comprises an electric motor 11 and a transmission unit 10.

Figure 3:
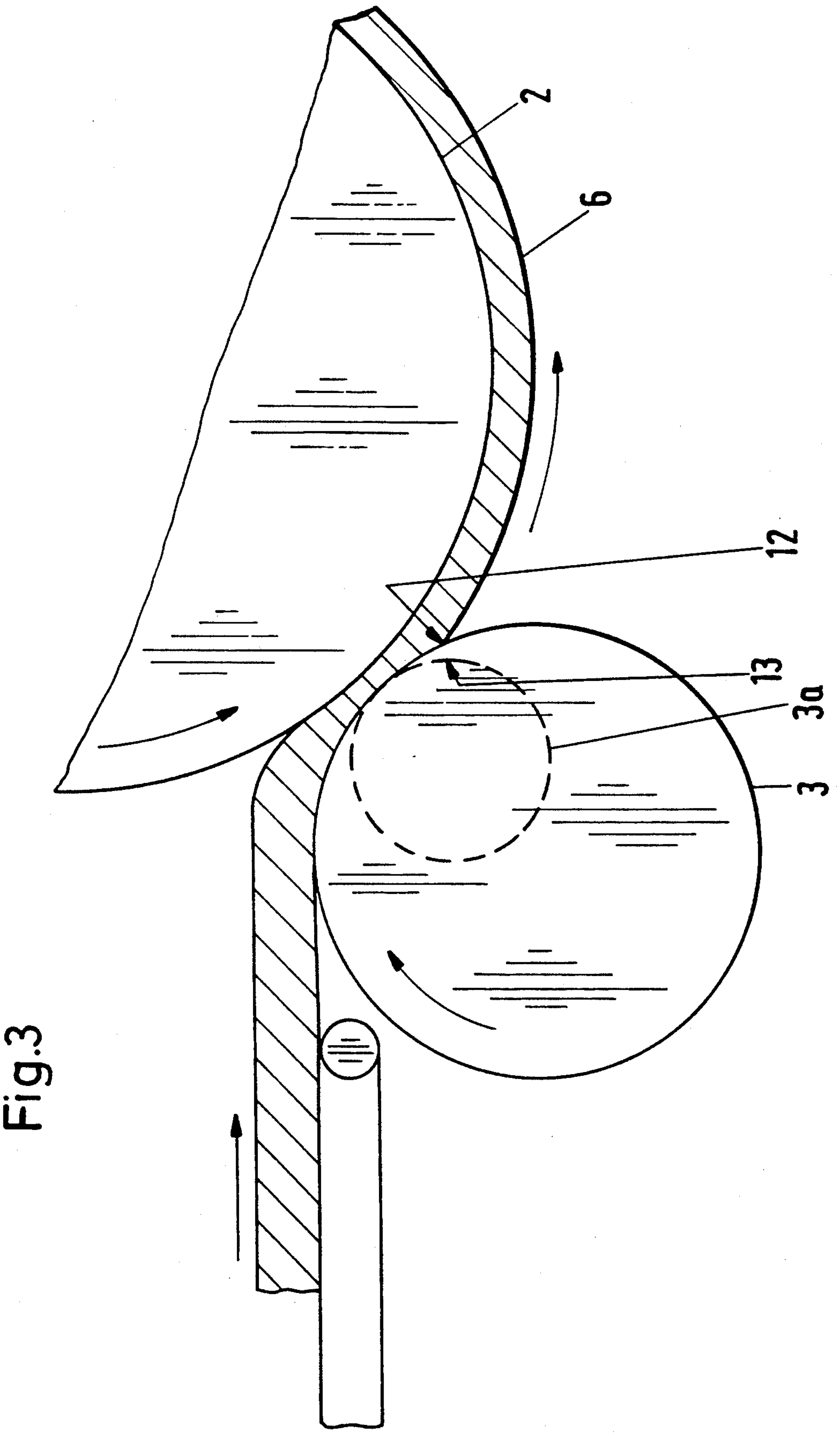
FIG. 3 is a cross-sectional view on an enlarged scale, through part of a press drum and a feed roller forming part of the press shown in FIG. 1 and also shows, in broken lines, a feed roller as used in prior art arrangements for comparative purposes.

FIG. 3 shows, on an enlarged scale, a portion of a feed roller 3 in accordance with the present invention. For comparison purposes only, a prior art feed roller 3*a* has been drawn to the same scale and is shown in broken lines. This figure illustrates the effect of increasing the diameter of the feed roller on the steel band and on the layer of wood chips. As the band 6 and the layer of wood chips enter the nip between the roller 3 and the drum 2, the band is bent and the thickness of the layer is substantially reduced. As the band and the layer move out of the nip, the force bending the band is removed and it returns to its original spacing from the drum 2. As can be clearly seen in FIG. 3, such return of the band occurs far more gradually if the roller 3 is large. This can be readily seen by comparing the exit points 12 and 13. In the case of the prior art roller 3*a*, the force pressing the band 6 toward the drum 2 abruptly diminishes at point 13, thereby causing the band to bend substantially during a very short distance of travel. In comparison, with the larger roller 3, the force diminishes gradually and the band only gradually reverts to its original spacing. Accordingly, less strain is placed on the band and its service-life is prolonged.

Similarly, by providing the feed roller 3 with a diameter of at least 2 m the angle of feed of the material into the nip between the feed roller 3 and the press drum 2 is much shallower than is the case using a roller 3*a* of smaller dimensions. Accordingly, by using a larger roller, less resistance is encountered during the feeding of the material.

It has, however, become apparent that, although the feed roller may have a minimum diameter of 2 m and that such an arrangement produces acceptable results, the tensile forces acting when the material is fed into the nip by means of the endless band 6 can be overcome in an even more satisfactory manner. To achieve this, the feed roller is provided with a diameter of 3 m.

I claim:

1. A press for the continuous production of thin chipboard and fibreboard from layers of wood chips and fibres and at least one bonding agent, comprising a press drum; support means mounting said drum for rotation; said drum including an external curved surface; a feed roller disposed adjacent said press drum, said feed roller including an external curved surface, said external curved surfaces jointly defining a nip; an endless steel band disposed around a major portion of said curved surface of said drum and passing through said nip; said band carrying said layers whereby said layers are compressed between said band and said curved surface of said drum; a plurality of roller means acting on said band to guide, to tension and to apply pressure to said band such that said chip and fibre layers and bonding agent are subjected to a surface pressure between said band and said press drum and are subjected to a drawing pressure in nips defined between said press drum and said pressure rollers, and further roller means for discharging said board thus produced; wherein said steel band is disposed around a major port of said external curved surface of said feed roller and said feed roller has a diameter of at least 2 m, and separate drive means for said feed roller, said drive means being directly connected to said feed roller for directly driving said feed roller.

2. A press as recited in claim 1, wherein said feed roller has a diameter lying in the range of 2 to 3.5 m.

3. A press as recited in claim 2, wherein said feed roller has a diameter of 3 m.

4. A press as recited in claim 1, wherein said drive means for said feed roller comprises electrical drive means and a transmission unit transmitting said drive from said drive means to said feed roller.

* * * * *